United States Patent [19]
Darboux et al.

[11] Patent Number: 5,307,421
[45] Date of Patent: Apr. 26, 1994

[54] PROCESS FOR PRODUCING A SYNTHESIZED REFERENCE IMAGE FOR THE INSPECTION OF OBJECTS AND APPARATUS FOR PERFORMING THE SAME

[75] Inventors: Michel Darboux, Grenoble; Rosolino Lionti, Seyssins, both of France

[73] Assignee: Commissariat a l'Energie Atomique, Paris, France

[21] Appl. No.: 960,685

[22] Filed: Oct. 14, 1992

[51] Int. Cl.$^5$ ............................................... G06K 9/60
[52] U.S. Cl. .................................. 382/8; 382/34; 382/14; 395/118
[58] Field of Search ............... 382/8, 41, 34, 14; 356/394; 395/125, 118

[56] References Cited

U.S. PATENT DOCUMENTS

| | | | |
|---|---|---|---|
| 4,783,826 | 11/1988 | Koso | 382/8 |
| 4,805,123 | 2/1989 | Specht et al. | 382/34 |
| 4,893,346 | 1/1990 | Bishop | 382/30 |
| 4,926,489 | 5/1990 | Danielson et al. | 382/34 |
| 4,962,541 | 10/1990 | Doi et al. | 382/34 |
| 5,125,040 | 6/1992 | Matsui et al. | 382/34 |

FOREIGN PATENT DOCUMENTS 0163264 12/1985 European Pat. Off. .
0354031 2/1990 European Pat. Off. .

OTHER PUBLICATIONS

S. Takeuchi et al., "Advanced 5x Reticle Inspection Technologies for ULSI Devices", pp. 195–204, 1990, *Integrated Circuit Metrology, Inspection, and Process Control IV,* SPIE vol. 1261.

Primary Examiner—Leo H. Boudreau
Assistant Examiner—Larry J. Prikockis
Attorney, Agent, or Firm—Burns, Doane, Swecker & Mathis

[57] ABSTRACT

The process consists of producing a first binary image (104) from descriptive data of an integrated circuit (or another type of object) to be inspected, the data being stored in a data base (102). Real images of characteristic elements of the integrated circuit to be inspected are then acquired (200) and processed so as to be applicable (300) to the binary image, as a function of their associated positions. A this obtained synthesis image is considered as a reference image with which are compared the images of the circuits to be inspected. This process is applicable to numerous types of industrially produced objects requiring a very precise inspection.

10 Claims, 7 Drawing Sheets

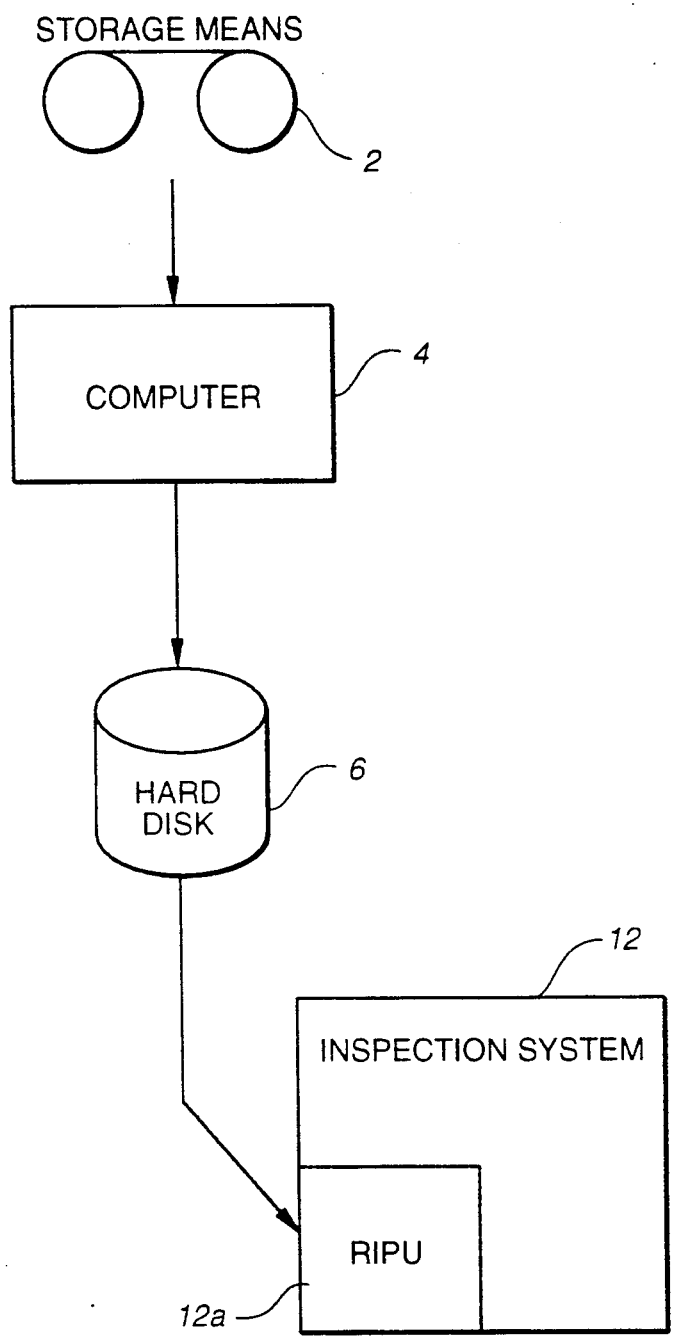
FIG._1

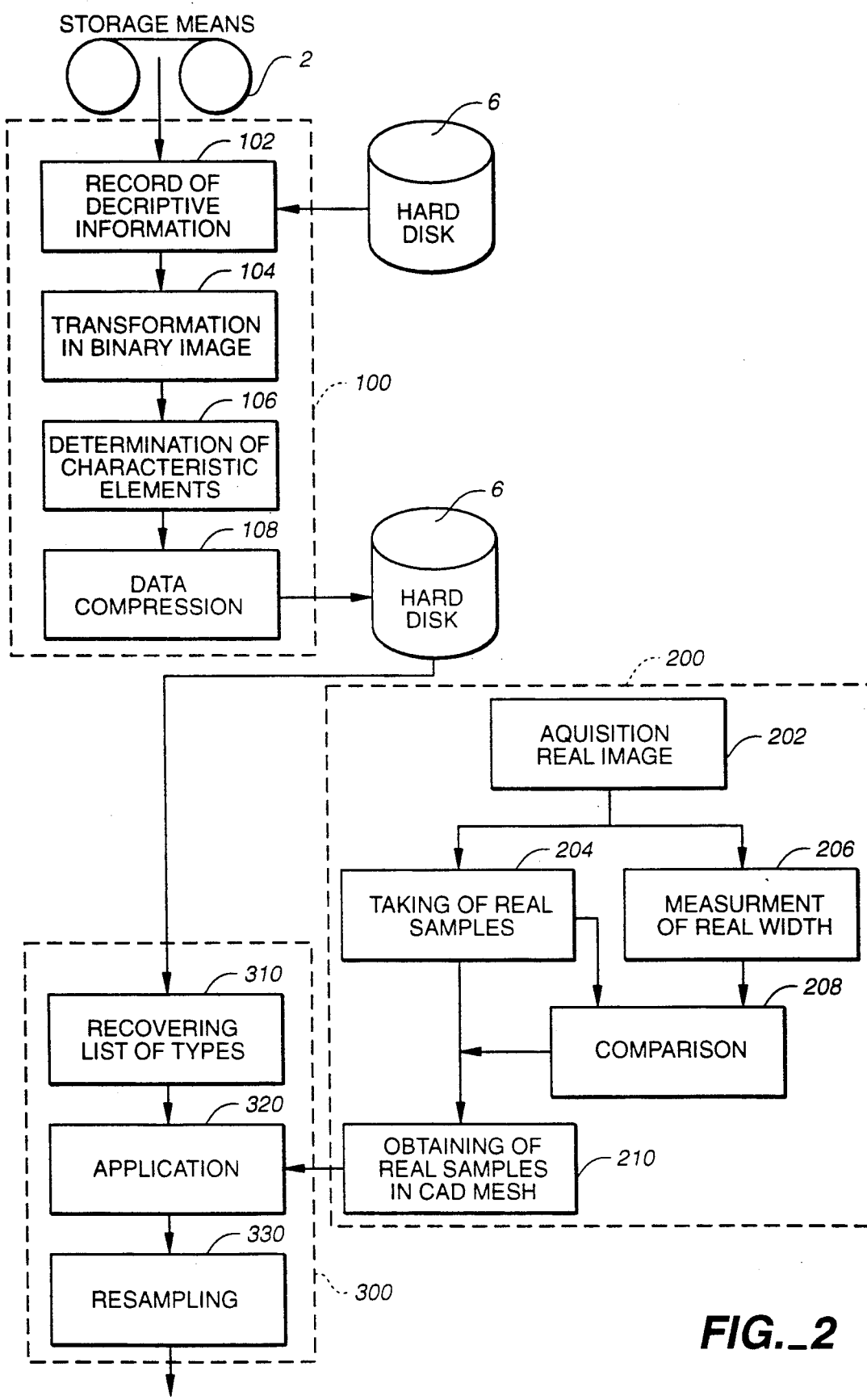
FIG._2

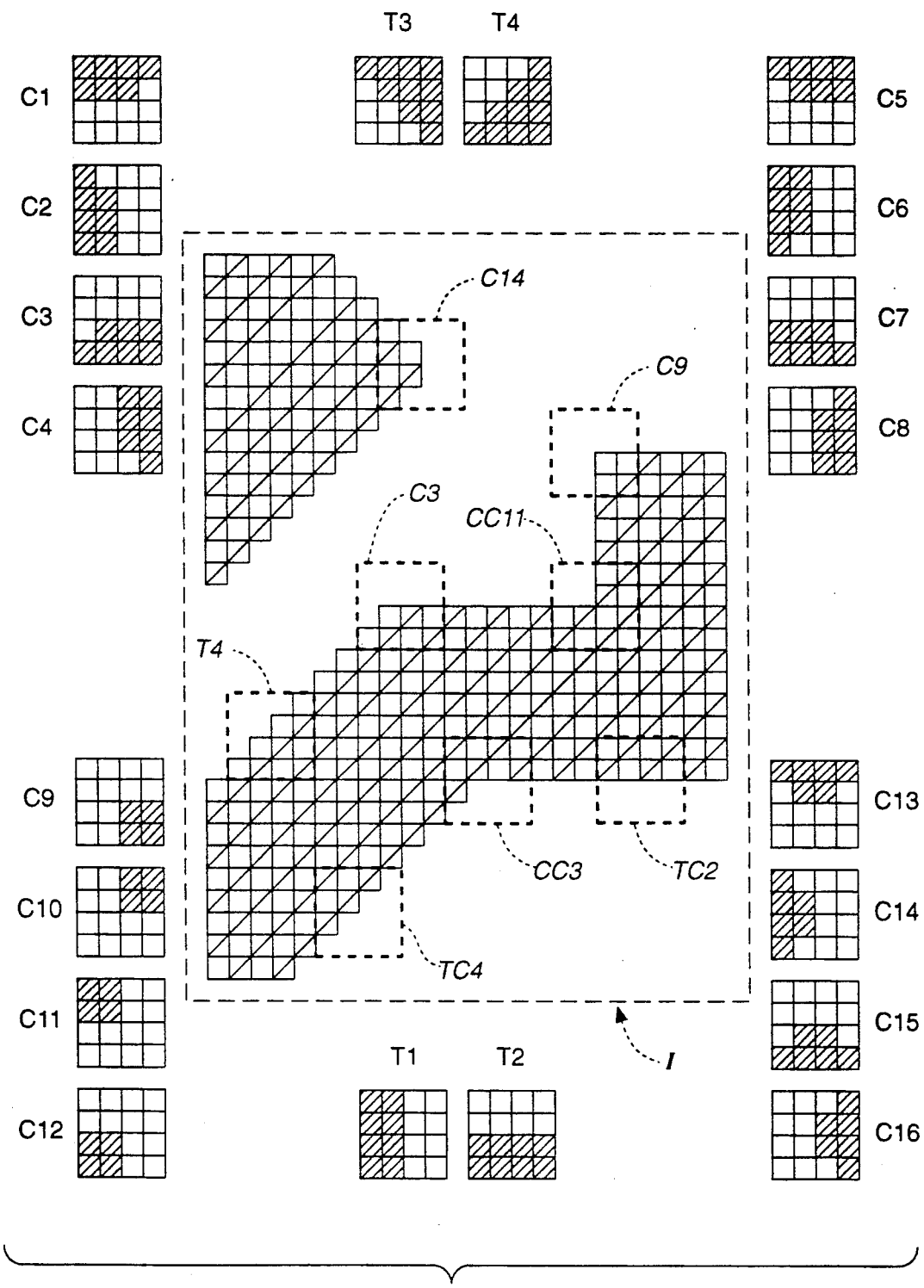
FIG._3

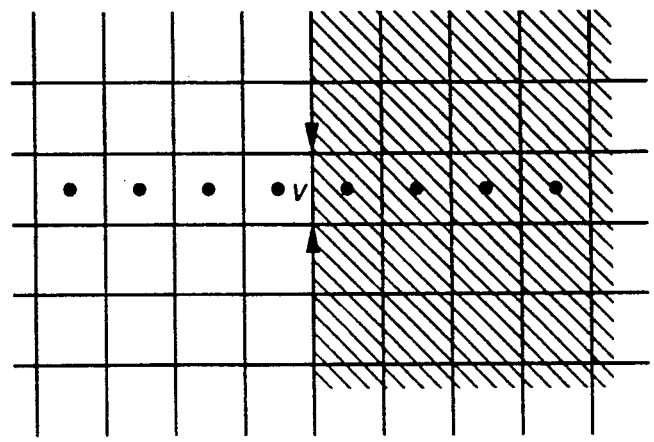
*FIG._4A*
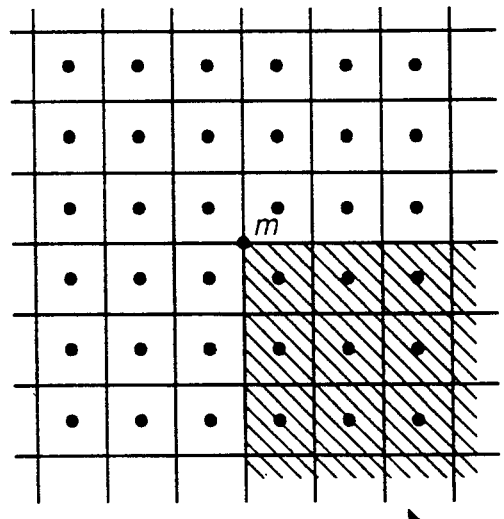
*FIG._4B*

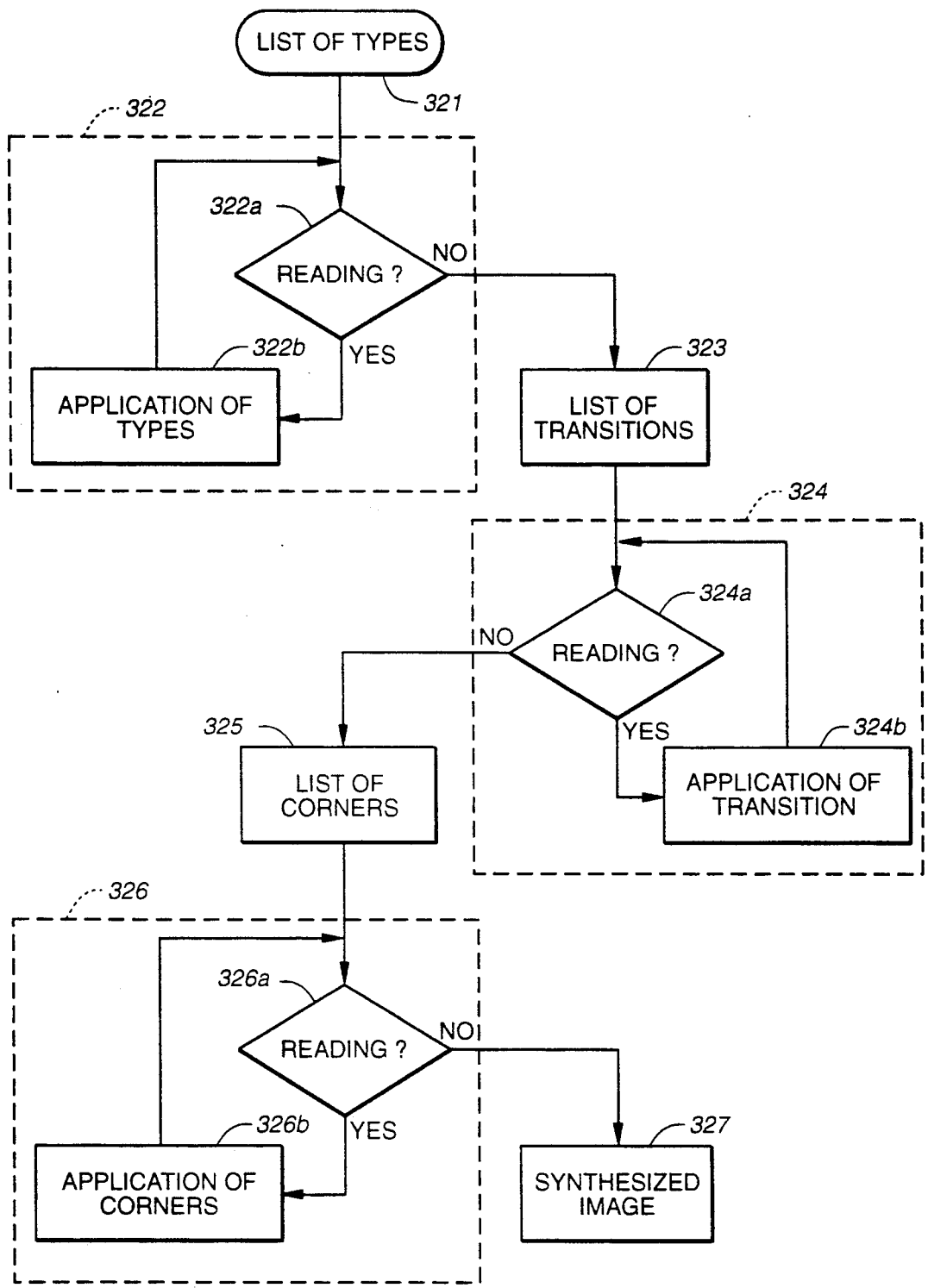
FIG._5

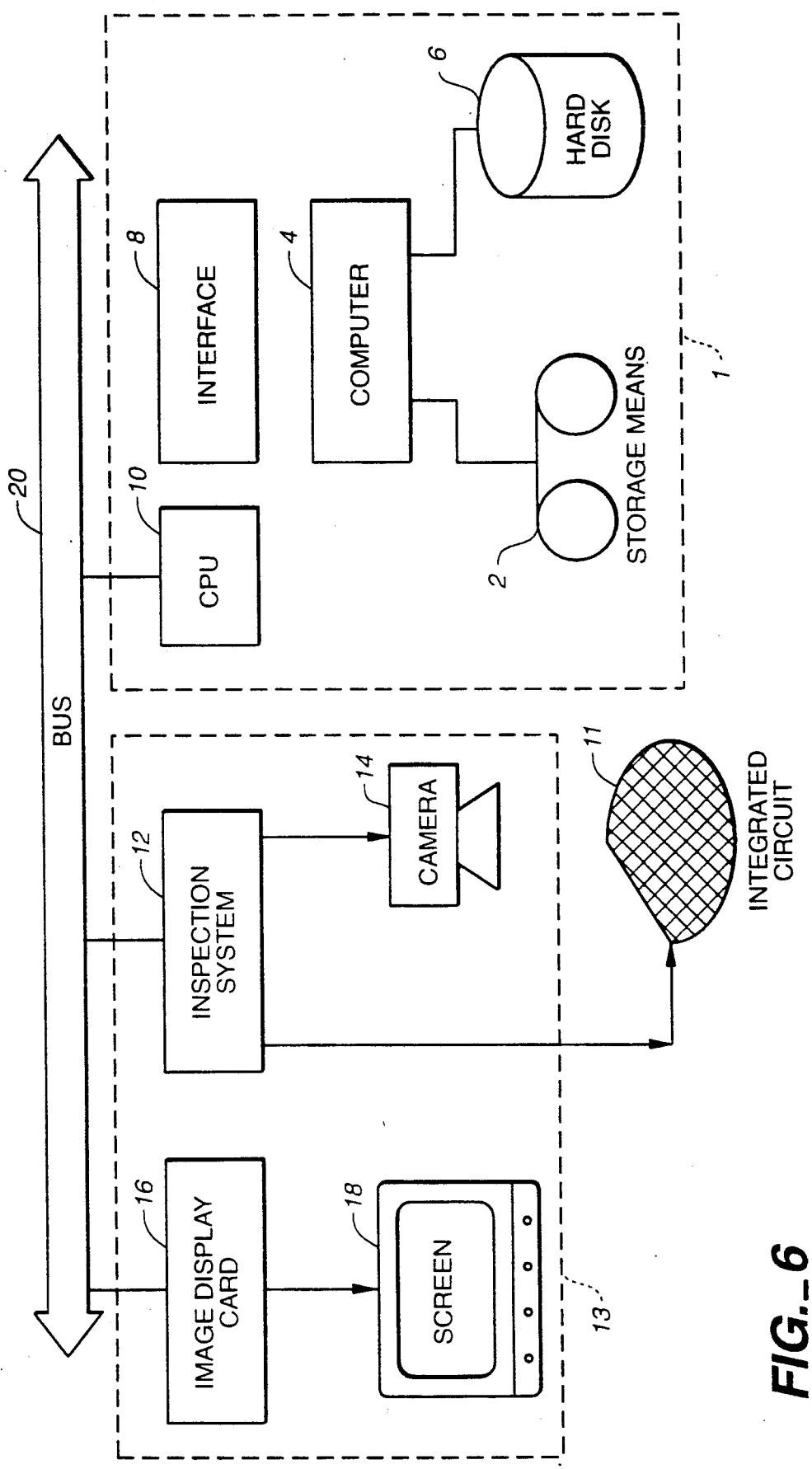
FIG._6

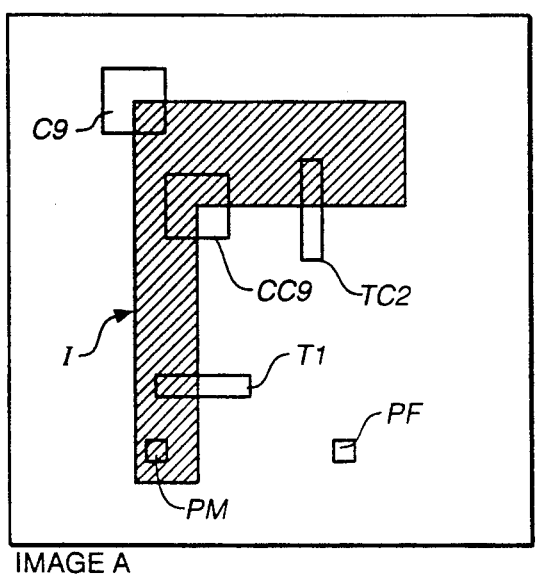
FIG._7A
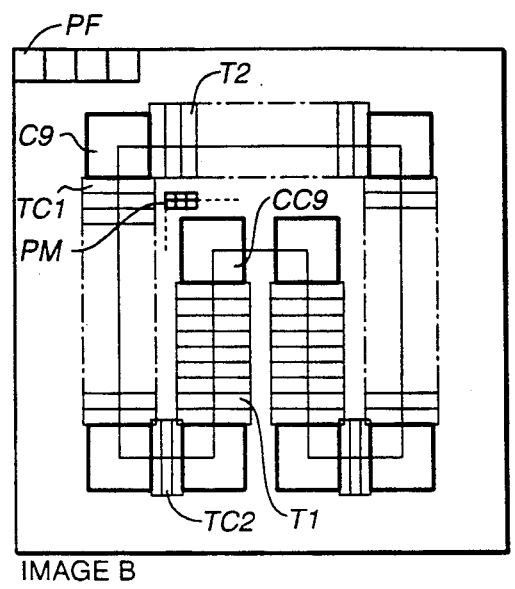
FIG._7B
FIG._7C
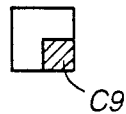
FIG._7D
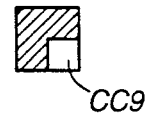
FIG._7E
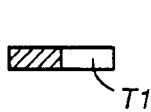
FIG._7F
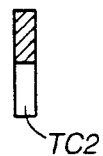
FIG._7G
FIG._7H
FIG._7I

PROCESS FOR PRODUCING A SYNTHESIZED REFERENCE IMAGE FOR THE INSPECTION OF OBJECTS AND APPARATUS FOR PERFORMING THE SAME

The present invention relates to a process and to an apparatus making it possible to produce a synthesis image used, during the comparison of images, as a reference image.

Such a process has numerous applications in the field of industrial inspection, where the aim is to inspect an object by the comparison of the image thereof with a synthesized reference image. More particularly, the invention can be used for the inspection of integrated circuits produced in an industrial production line.

It is known to detect possible defects of industrial objects and more particularly integrated circuits by using comparison processes in display machines. In such processes, one of the images is based on reality and represents the object to be inspected, whereas the other image corresponds to a fault-free, perfect object. In certain known applications this reference image representing a perfect object is constructed from informations from a design data base (CAD data base). It is then a synthesis image. However, the binary design image obtained in this way from design data is not always sufficiently precise c ed with reality, particularly with regards to rounded parts, curves and light contrasts which exist in reality.

In order to make these images more "realistic", it is possible to perform a process based on the filtering of the design image obtained from the computer assisted design or CAD data. This filtering more particularly makes it possible to round the angles in order to make the said image more realistic and closer to the image of the object to be inspected.

Such a process is described in the article "Advanced 5× reticle inspection technologies for U.L.S.I. devices", written by Mrs. TAKELJCHI, JOSEPH, YOSHIDA, MORIIZLMI, PARKER and WATAKABE and published in 1990 in the journal S.P.I.E., vol. 261, No. 1.

A process for generating a new graphic scene by the replacement of certain graphic patterns is described in EP-A-354 031, filed on Aug. 3 1989 by the XEROX CORPORATION. This process consists of carrying out a first stage of choosing graphic patterns which have to be sought. It then consists of carrying out a second search stage in the graphic scene for all occurrences of the previously chosen graphic patterns. Finally, this process consists of a third stage of replacing, within the graphic scene, said graphic patterns by other patterns generally coming from a library.

Such a process cannot be applied to the generation of images to be used as a reference during an inspection by the comparison of objects such as integrated circuits. Thus, the comparison of such images with images of real scenes is not sufficiently accurate to detect the very small defects in the objects to be inspected. The above-described process consequently does not make it possible to generate a reference image which is sufficiently close to a real image in order to have no discontinuity, particularly in the variations of the grey levels of the image.

The object of the present invention is to obviate this disadvantage. Thus, it proposes a process making it possible to replace, on a binary image obtained by transformation of design data from a CAD data base, the graphic patterns (representing the characteristic elements of the object) by real images of said characteristic elements.

In order to carry out such a replacement of the graphic patterns by real images, the process proposes carrying out a mesh change consisting of passing camera mesh characteristic images to CAD mesh characteristic images. It also proposes a precise centering of the characteristic elements making it possible to ensure a continuity of the reference image, particularly in grey level variations.

More specifically, the present invention relates to a process for producing a reference image synthesized from image processing means and imaging means, characterized in that it consists of performing, on the basis of descriptive information of an object to be inspected, the following operations:

(a) the determination of characteristic elements of the object to be inspected, (b) the determination of position information relative to said characteristic elements in the descriptive information, on the basis of image processing means, (c) acquisition, by imaging means, of at least one real image of a field of the object to be inspected, said real image incorporating at least the real image of a characteristic element, (d) repositioning, by the image processing means, of the real images of the characteristic elements as a function of position information determined in (b), the image obtained constituting the reference image.

This image can then be c ed with real images of the objects to be inspected.

Advantageously, the operation (c) consists of displacing an observation field on the object, determining said fields containing the characteristic elements determined in (a) and carrying out the acquisition of real images of these fields.

Moreover, the process consists, after operation (d), of carrying out a reference image storage operation (e).

The descriptive information is preferably used in the form of a binary image in order to facilitate processing, particularly that performed during operations (a) and (b). Moreover, the operation (d) advantageously consists of replacing, for each position information, the characteristic elements represented on the binary image by the real images of the corresponding characteristic elements.

According to another embodiment of the invention, repositioning could also be carried out directly on an information-free image (i.e. an empty table).

Advantageously, the process also comprises an operation of resampling real images of characteristic elements obtained in (c).

More specifically, this resampling comprises a centering calculation operation on the real images of the characteristic elements. It also comprises an operation of calculating a width variation between the characteristic element represented on the binary image and its corresponding real image.

According to the invention, operation (b) involves a suboperation of establishing a list in which the characteristic elements are respectively associated with their positions.

The invention is described in greater detail hereinafter relative to non-limitative embodiments and with reference to the attached drawings, wherein show:

FIG. 1: A diagrammatic representation of the path of the data through the apparatus for performing the process of the invention.

FIG. 2: An operational diagram showing the stages of the process according to the invention.

FIG. 3: A representation of sought characteristic elements in the binary image during the operation (b).

FIGS. 4A-B: A representation of the positioning of characteristic elements such as transitions and corners during the repositioning operation (d).

FIG. 5: An operational diagram showing the different stages of the operation (d).

FIG. 6: A diagrammatic representation of an apparatus for performing the process of FIG. 2.

FIGS. 7A-I: An example of an image synthesized according to said process.

Throughout the following description, use will be made as an exemplified embodiment of the invention of the application to the inspection of integrated circuits on wafers. Thus, the objects to be inspected will be the said integrated circuits.

Throughout the following description reference will be made to integrated circuits, but it is clear that other industrial objects or merely portions of integrated circuits could be involved. Thus, the process can be carried out for an integrated circuit portion and repeated for the same number of times as there are portions or fields to be inspected in the integrated circuit to be inspected.

FIG. 1 very diagrammatically shows the path followed by the data during the application of the process according to the invention. Thus, the descriptive data of the integrated circuit to be inspected are stored in information storage means 2, such as a magnetic tape or cassette. These descriptive data are CAD data, i.e. data recorded in a compact form optimizing the volume necessary for their storage.

These CAD data are transmitted to a center 4, which carries out the operations (a) and (b) described in greater detail hereinafter. The computer 4 makes it possible to determine the positions of the characteristic elements of the integrated circuits. The characteristic elements of an integrated circuit are e.g. one or more pixels representing the grey level of the background of the circuit (referred to as uniform zones of a first type), one or more pixels representing the grey level of patterns of the circuit (called uniform zone of a second type), corners of patterns, transitions (i.e. elements of the border or edge between the background and the pattern), special elements such as storage cells, contact holes, etc. The pixels representing the grey levels correspond to elements of real images. The computer 4 produces lists in which a characteristic element generally represented by a code is associated with one position. When this characteristic element is present several times in the integrated circuit, it is also present several times in the list, in which it is associated with each of these positions. These lists are recorded on a hard disk 6 to which the computer 4 can have access at any time.

These data contained in the list are transferred to an inspection system 12 incorporating a rapid image processing unit 12a (RIPLJ). This inspection system 12 makes it possible to carry out the operations (c) to (e) of the process according to the invention, which will be described hereinafter.

FIG. 2 is an operational diagram describing the different operations performed during the performance of the process according to the invention.

This process for producing a synthesized reference image can be broken down into three image data processing phases, namely: a preprocessing phase of CAD data represented by the block 100, a learning phase of the characteristic elements represented by the block 200, a synthesis phase represented by the block 300.

More specifically, the CAD data preprocessing phase 100 essentially consists of translating the CAD data into binary image data. Thus, the CAD data are "compact" data, i.e. each element of the CAD data base is only described once in said data base, no matter what the number of times it is present in the integrated circuit. Therefore these CAD data are retranslated into the form of a binary image, where the elements appear the same number of times as they occur in the integrated circuit. This binary image has the advantage of entirely representing the integrated circuit on a display screen.

Thus, the preprocessing phase 100 comprises a first stage 102 of recording in the CAD data base the descriptive information of the circuit contained in a bulk store such as a magnetic tape 2 and possibly known information stored e.g. on the hard disk 6.

These CAD data are advantageously retranslated, i.e. transformed, in the block 100, in the form of a binary image in order to facilitate subsequent processing operations. The image resolution of said binary image obtained in 104 is the sane as that of the CAD data base. Thus, in order to limit the information loss which can occur with such a transformation, said binary image is synthesized in the CAD mesh corresponding to the description system of the integrated circuit.

The term CAD mesh is understood to mean the respective sampling steps in accordance with the two directions of the plane containing the image. This CAD mesh can e.g. be 0.1 $\mu m \times 0.1$ $\mu m$ or 0.05 $\mu m \times 0.05$ $\mu m$ when the integrated circuit is very dense, i.e. when it has several characteristic elements.

The following stage represented by the block 106 consists of determining the characteristic elements of the integrated circuit to be inspected. The possible stage 107 consists of measuring the theoretical width of a particular pattern chosen in random manner within the binary image. This measurement, subsequently compared with the real width of a pattern of the sane type, will make it possible, in the manner shown hereinafter, to determine the variation between these two values.

Stage 106 consists of an observation, e.g. by a user, of different characteristic elements such as patterns, parts of patterns or groups of patterns present on the integrated circuit. On the basis of this visual observation, definition takes place of the characteristic elements, respectively in the form of a binary mask and from the binary image is extracted information relative to the position of said characteristic elements coded in this way.

This characteristic element position detection takes place on the theoretical binary image obtained in 104 and which is completely free from noise. It therefore consists of a simple decoding of configurations corresponding to said characteristic elements. Thus, the binary image is scanned using a window with sides of a few pixels. The content of the window is correlated with the characteristic elements coded in the form of masks. The content of the window corresponds to one of the sought characteristic elements. The window generally has the sane size as the mask of the characteristic element being sought.

Thus, within the block 106 is created a type image, i.e. an image representing the position of standard characteristic elements in the binary image (e.g. codes distributed within a table). This position information is obtained with an accuracy equal to the resolution of the design data base, said resolution generally exceeding the resolution of a real image, for which said resolution is given by the size of the pixels of the camera used for the acquisition of said real image. Thus, said detection is carried out with a subpixel precision in the capers mesh.

The block 108 of FIG. 2 represents the data compression stage, in which a list of types is established. This list contains the characteristic elements and their associated positions.

This list and the theoretical width of a pattern are e.g. stored on the hard disk 6 from which the information contained in said list will be withdrawn at the time of the synthesis phase 300.

The coding of the type or standard image in the form of a list makes it possible to condense the information contained in said image and therefore reduce the data volume to be stored during the preprocessing phase. This condensing of information advantageously makes it possible to reduce the transfer time for said information.

In another embodiment, said list can be obtained directly following the characteristic element position detection stage 104. The passage through a type image is not obligatory and is dependent on the choice of processing operations used for obtaining the standard list from the stage 104.

The learning phase is represented in FIG. 2 by the block 200. This phase relates to the acquisition of real images of the characteristic elements.

In general terms, when the real image of the integrated circuit (or part of the integrated circuit) is acquired, the user samples therein those image portions corresponding to the characteristic elements. These image portions can be individual or grouped pixels, row portions, column portions, etc. The image portions are chosen so as to be free from faults. For this purpose, the user selects the circuit to be used for said phase, e.g. by means of a microscope. It is also the user who chooses, on said circuit the image portions used in the processing operation, so that they make it possible to produce a reference image for all the circuits to be inspected having elements of the same type.

More specifically, the acquisition of the real image is carried out during a stage 202. The resolution of this real image is identical to the resolution of the image sensor or camera. The stage of taking samples and which follows the stage 202 involves a stage 204 and possibly a stage 206 respectively for the taking of real samples of the characteristic elements and the measurement of the real width of the pattern previously defined in stage 107.

The patterns of the integrated circuit can be overetched or underetched. Thus, for producing integrated circuits, use is made of microlithography processes, which can be subject to pattern size fluctuations. These fluctuations are due to the etching process. An excessively etched pattern will be smaller than the reference size of the corresponding pattern in the binary image. A not adequately etched pattern will be larger than said reference size.

Moreover, the comparison between the real width of the pattern, determined in stage 206, and the theoretical width of said pattern, determined in stage 107 and stored on the disk 6, will make it possible to obtain the variation or offset between these two values. This comparison stage is performed in the subsequently described stage 208.

In order to carry out the stage 204 of taking samples of the characteristic elements, the user e.g. uses the inspection system in a semiautomatic mode. This inspection system enables said user to displace an observation field on the surface of the integrated circuit. He therefore analyzes the constitution of said circuit in order to choose the characteristic elements which are most appropriate. In other words, he seeks a defect-free circuit field containing the chosen characteristic elements. The real image of this field is then acquired and called the "learning image".

As an example of learning, when the integrated circuit to be inspected is not very dense and has widely varying patterns, the ample taking operation relates to the corners and transitions considered individually. However, when the integrated circuit is dense, the user takes samples of a larger size, such as complete patterns, e.g. of storage cells or contact holes. Thus, each contact hole is constituted by four corners and four transitions, but said transitions and corners are very small and close to one another, which requires a processing close to the resolution limit. In such a very dense integrated circuit, it is then preferable to take larger size samples.

Moreover, in certain cases, it is difficult to determine a single field containing all the defect-free characteristic elements. According to the invention, it is possible to choose several fields, i.e. several learning images, which will then be successively processed. Real samples of characteristic elements (corners, transitions, etc.) are therefore sampled from said learning image.

Moreover, these samples do not generally have a precise location in the learning image, because the camera permitting the acquisition of these images does not have a fixed position, i.e. a predetermined position relative to the integrated circuit. Thus, the corners and transitions are in a random position with respect to the mesh of the camera.

A resampling operation 208 is then introduced into the learning phase 200. This resampling operation makes it possible to displace the samples taking account of the centering calculation performed on the real samples of the transitions and corners, as well as the measurement of the offset of overetching or underetching performed during said sane stage. For this purpose, the centering calculation consists of determining the offset between the random position of the characteristic elements and a so-called centered position in the mesh of the sensor. This offset is then added algebraically to the overetching or underetching offset.

The samples of the characteristic elements are then displaced from said total offset or variation by a first resampling stage. Moreover, the operation 208 effects the passage of the camera mesh samples to CAD mesh samples by a second resampling. These resampling operations can be performed in one or more stages in accordance with known processes, such as linear interpolation.

When this resampling operation 208 has been performed, at 210 real samples are obtained in the CAD mesh, i.e. with a resolution identical to that of the information contained in the CAD data base.

The real images of the characteristic elements are then advantageously recorded in a library, such as a bulk memory which can be the disk 6, the memory of the system 12 described hereinbefore or the memory of a subsequently described card or map. Said images can be sought in said library and used during the synthesis of a reference image. During an updating of a reference image following aspect variations of the circuit corresponding to said image, the recorded real images are replaced by those taken on the new circuit. The real images of characteristic elements will be directly sampled or taken in the library at the time of applying the synthesis phase 300.

The synthesis phase 300 consists of replacing in the image undergoing synthesis, i.e. in the type image, the values of the pixels by new values corresponding to those of real samples of the characteristic elements coming from the learning phase 200. This operation of replacement by real samples is carried out for each of the positions detected in the preprocessing phase 100.

More specifically, the stage 310 of recovering the list of types consists of seeking on the hard disk 6, the information contained in said list. A decompression of the data takes place (namely an operation which is the reverse of that consisting of transforming the type image into a type list) in order to find the type image to which is applied, during the operation 320, the real samples determined in 210.

This application operation 320 consists, by a substitution method, of splicing or sticking the samples taken into the learning image to the pixels identified during the characteristic element determination operation 106. Following the operation 320, a synthesized image is obtained having grey levels, like a real image. This synthesized image is developed in a CAD mesh. A final resampling operation 330 makes it possible to modify said final image to a synthesized image in the mesh of the sensor (namely the camera). This last resampling operation can, according to an embodiment, consist of a linear interpolation.

FIG. 3 shows an example of the different patterns sought during the position detection operation 106. The operation 106 consists of identifying, on the binary image obtained in 104, the application locations of the real scales obtained in 210. This detection consists of a decoding of the configurations corresponding to the transitions and to the corners.

There are generally thirty two corners, whereof sixteen are represented by the matrixes C1 to C16 in FIG. 3, whilst the other sixteen (not shown) are complimentary corners of said matrixes C1 to C16. The term complimentary corners is understood to mean the matrixes of corners in which the light or clear zones of the corners shown in FIG. 3 are the grey zones, when it is a question of complimentary corners and vice versa.

There are also eight transition configurations:

a vertical transition T1 and its complimentary, not shown transition, a horizontal transition T2 and its complimentary transition TC2, represented in the binary image example I, a descending transition T3 (gradient 135°) and its complimentary transition, a rising transition T4 (gradient 45°) and its complimentary transition Tc4.

In the dotted line zone I is shown in exemplified manner a binary image, in which the different corners and transitions are sought. On said binary image it is possible to mark or designate the corners C14, C9 and C3 and the corners CC11 and CC3 complimentary of the respective corners C11 and C3. It is also possible to mark the transition T4 and the transitions TC4 and TC2 complimentary of the respective transitions T4 and T2.

According to an embodiment of the invention, it is possible to limit the number of transitions and corners sampled during learning by using axial symmetries which e.g. transform a corner C10 and a corner C11.

FIGS. 4A-B show a transition in the form of a transition vector and a corner in the form of a corner matrix during "sticking" 320 (also called application) of the real samples, taken and centered during the learning phase 200 on the binary image. These vectors and matrixes are advantageously of equal sides and length, so as to easily mark the centre of said vector and said matrix.

Zone A of FIG. 4A shows a vector of centre v positioned so that its centre v corresponds to the transition of the binary image. Zone B of FIG. 4B shows a matrix of centre m positioned so that its centre m corresponds to the corner of the binary matrix.

FIG. 5 shows in exemplified manner an operational diagram of the operation 320 of applying real samples (in the case where they are constituted by uniform zones, transitions and corners), in which the aim is to stick the real samples, taken in the learning phase 200, to the pixels identified during the type detection phase 106.

The operation 320 consists of three stages. There is an application of uniform zones (two types of uniform zones, namely a first type PF and a second type PM), which are contained in the list of types and said list is loaded at 321. A processing loop 322 makes it possible to read by the test 322a all the zones of the list and replace them at 322b by corresponding real samples. The elements of the list other than these zones are then transferred into 323. There is then an application of transitions contained in the list of types, the list of transitions being sought in 323 and exploited. For this purpose a loop 324 permits an identical operation to the loop 322 for the reading by the test 324a and the application of transitions at 324b. The elements of the list of types, other than the uniform zones and transitions, are then transferred to 325. There is then an application of the corners contained in the list of types. A third loop 326 permits the reading by the test 326a of the corners contained in 325 and the application to 326b of all the corners on the image. When the list of corners has been entirely read in 326a, the resampling operation 330 is performed to make it possible to obtain the synthesized reference image.

Thus, at the end of each of the loops 322, 324 and 326, an image is obtained in the CAD mesh. The binary image is transformed into a uniform zone image in the CAD mesh following the application of the loop 322. This image is transformed into an image of uniform zones and transitions in the CAD mesh, following the loop 324, which is itself transformed into an image of uniform zones, transitions and corners in the CAD mesh following the application of the processing loop 326. Finally, a previously described resampling 330 makes it possible to obtain the synthesized image in the mesh of the sensor.

FIG. 6 shows an example of an apparatus making it possible to perform the process according to the invention. This apparatus comprises image processing means 1 and shooting means such as a machine 13 for the interactive inspection of the integrated circuit 11. The integrated circuit 11 to be inspected is located on a not shown mechanical table.

The inspection machine 13 comprises an inspection subsystem 12, a CCD camera 14 associated with a microscope 15, an image display card or map 16 and a unit 18 making it possible for the user to display the images and make his choices (e.g. image fields). Therefore this machine makes it possible to carry out the acquisition and comparison of images.

The processing means 1 incorporate a computer 4 equipped with a hard disk 6, a magnetic tape reader 2 (or as a function of the selected embodiment a cassette reader) and a coupler 8 ensuring the coupling between the computer 4 and the rapid image processing unit (RIPU) of the inspection subsystem 12 via a bus 20. The processing means 1 also incorporate a CPU (central processing unit) card 10.

As a function of the Embodiment of the apparatus according to the invention, the CPU card 10 and the computer 4 are separate, because the computer can be directly integrated into the master computing installation of the factory manufacturing the integrated circuits to be inspected.

The data bus 20 transmits the informations between the image processing means 1 and the inspection machine 13. More specifically, the display card 16, the inspection subsystem 12, the CPU card 10 and the coupler 8 are connected to the said bus 20.

The operations 102 to 108, performed during the preprocessing phase 100, are processed by the computer 4.

The following operations constituting the learning phase 200 are performed on the basis of the display unit 18, the camera 14 and the inspection subsystem 12, which controls the relative displacements between the integrated circuit 11 and the camera 14, as well as the acquisition of real images of said integrated circuit. The images of the characteristic elements of the circuit 11, i.e. the real samples obtained, are stored in the CPU card memory, where they are sought at the time of the application operation 320.

During the synthesis phase 300, the list of types stored on the hard disk 6 is transferred to the memory of the CPU card 10. The processor of said card 10 carries out characteristic element application operations 320.

The thus obtained synthesized image is transferred to the inspection subsystem 12, where it is used as a reference image during comparisons with images of integrated circuits to be inspected.

In order to permit a better understanding of the process described hereinbefore, FIGS. 7A-7I shows an exemplified use of the process according to the invention.

On image A of FIG. 7A is shown a learning image with the characteristic elements thereof, such as the corner C9, the complimentary corner CC9, the vertical transition T1, the complimentary horizontal transition TC2 and the pixels of the first uniform zone type PF and the second uniform zone type FM.

On image B of FIG. 7B is shown the image obtained at the time of applying the real samples to the binary image, as a function of the list of positions obtained in the preprocessing phase.

On the image C of FIG. 7C is shown the synthesized image obtained and which will be considered as the reference image at the time of inspecting the industrialized objects.

This example of FIGS. 7A-7I provides a better understanding of the process according to the invention, but is only a simple example of a relatively non-dense circuit.

We claim:

1. A process for producing a reference image of objects to be inspected, this reference image being synthesized from image processing means (1) and imaging means (13), using a database description of these objects to be inspected, and a corresponding real object used as a model of these objects, comprising the steps of:
    a) determining from the database description (100) characteristic elements of the objects to be inspected,
    b) determining from the database description position information pertaining to said characteristic elements in the database description using image processing means,
    c) acquiring (200) using imaging means, a real image of a field of the model object, said real image incorporating at least the real image of a characteristic element, this step being repeated so as to obtain all the real images of the characteristic elements,
    d) using the image processing means, placing the real images of the characteristic elements in accordance with position information determined in step (b), the image obtained constituting the reference image.

2. Process according to claim 1, characterized in that the operation (c) consists of displacing the model object with respect to the imaging means so as to determine said field or fields containing the characteristic elements determined in (a) and carry out the acquisition of real images of these fields.

3. Process according to claim 1, characterized in that it also consists of performing, following operation (d), a reference image storage operation (e).

4. Process according to claim 1, characterized in that it firstly consists of constructing a binary image using the database description.

5. Process according to claim 4, characterized in that the operation (d) consists of replacing, for each position information, the characteristic elements represented on the binary image by real images of corresponding characteristic elements.

6. Process according to claim 4, characterized in that it also comprises an operation (208) of resampling real images of the characteristic elements obtained in (c).

7. Process according to claim 6, characterized in that the resampling operation comprises a centering calculation operation on the real images of the characteristic elements.

8. Process according to claim 6, characterized in that the resampling operation comprises an operation of calculating a width variation between the image characteristic elements represented on the binary image and its corresponding real images.

9. Process according to claim 6, characterized in that the resampling operation comprises a mesh change operation for transforming the real images of the characteristic elements from a mesh of the imaging means to a mesh of the database description.

10. Process according to claim 1, characterized in that the operation (b) comprises a suboperation (108) of establishing a list in which the characteristic elements are respectively associated with their positions.

* * * * *